United States Patent
Pei et al.

(10) Patent No.: US 11,006,482 B2
(45) Date of Patent: May 11, 2021

(54) UPGRADING ACCESS POINTS

(71) Applicant: Hewlett Packard Enterprise Development LP, Houston, TX (US)

(72) Inventors: Jikui Pei, Beijing (CN); Yan Liu, Chongqing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 59 days.

(21) Appl. No.: 16/494,736

(22) PCT Filed: Mar. 15, 2017

(86) PCT No.: PCT/CN2017/076777
§ 371 (c)(1),
(2) Date: Sep. 16, 2019

(87) PCT Pub. No.: WO2018/165908
PCT Pub. Date: Sep. 20, 2018

(65) Prior Publication Data
US 2020/0015320 A1 Jan. 9, 2020

(51) Int. Cl.
*H04W 88/08* (2009.01)
*H04L 12/24* (2006.01)
(Continued)

(52) U.S. Cl.
CPC .............. *H04W 88/08* (2013.01); *G06F 8/65* (2013.01); *H04L 12/4641* (2013.01);
(Continued)

(58) Field of Classification Search
CPC ..... H04W 88/08; H04W 24/02; H04W 24/04; H04W 28/16; G06F 8/65; H04L 12/4641; H04L 41/082; H04L 2012/5621
See application file for complete search history.

(56) References Cited

U.S. PATENT DOCUMENTS

| 7,770,168 B1 | 8/2010 | Howarth et al. |
| 9,081,643 B2 | 7/2015 | Wang et al. |
| (Continued) | | |

FOREIGN PATENT DOCUMENTS

| CN | 102395144 | 3/2012 |
| CN | 103167535 | 6/2013 |
| WO | WO-2015167321 A1 | 11/2015 |

OTHER PUBLICATIONS

Eric Moyers, Access Point Firmware Upgrade Through Single Point Setup, Apr. 27, 2016, 3 Pgs.
(Continued)

*Primary Examiner* — Candal Elpenord
(74) *Attorney, Agent, or Firm* — Brooks, Cameron & Huebsch, PLLC

(57) ABSTRACT

Example implementations relate to upgrading access points (APs). In some examples, a primary AP may comprise a processing resource and a memory resource storing machine readable instructions to determine, in response to receiving a data transmission from a secondary AP, whether an image version of the secondary AP and a class of the secondary AP are a same image version and class as the primary AP, determine whether the class of the secondary AP is a same class as a seed AP, and instruct the secondary AP, in response to the seed AP being the same class as the secondary AP, to upgrade the image version of the secondary AP from the seed AP.

15 Claims, 5 Drawing Sheets

(51) Int. Cl.
    *H04W 24/02*     (2009.01)
    *G06F 8/65*     (2018.01)
    *H04L 12/46*     (2006.01)
    *H04W 28/16*     (2009.01)
    *H04L 12/70*     (2013.01)

(52) U.S. Cl.
    CPC ........... H04L 41/082 (2013.01); H04W 24/02 (2013.01); H04W 28/16 (2013.01); *H04L 2012/5621* (2013.01)

(56) References Cited

U.S. PATENT DOCUMENTS

| | | | | |
|---|---|---|---|---|
| 9,894,604 | B1* | 2/2018 | Tran | H04W 48/20 |
| 2009/0042557 | A1* | 2/2009 | Vardi | H04W 72/04 |
| | | | | 455/422.1 |
| 2009/0119855 | A1 | 5/2009 | Quilty | |
| 2009/0235246 | A1 | 9/2009 | Seal et al. | |
| 2011/0047538 | A1 | 2/2011 | Chung et al. | |
| 2012/0170471 | A1* | 7/2012 | Brown | H04W 48/20 |
| | | | | 370/252 |
| 2012/0257603 | A1 | 10/2012 | Mercier | |
| 2013/0260782 | A1* | 10/2013 | Un | H04W 64/003 |
| | | | | 455/456.1 |
| 2014/0293790 | A1* | 10/2014 | Xiao | H04W 48/06 |
| | | | | 370/235 |
| 2015/0222527 | A1* | 8/2015 | Shah | H04L 45/3065 |
| | | | | 370/338 |
| 2015/0312820 | A1* | 10/2015 | Yang | H04W 84/12 |
| | | | | 370/331 |
| 2016/0227369 | A1* | 8/2016 | Gao | H04W 64/00 |
| 2016/0255571 | A1* | 9/2016 | Yan | H04W 12/06 |
| | | | | 455/434 |
| 2018/0014243 | A1* | 1/2018 | Peng | H04W 72/06 |

OTHER PUBLICATIONS

International Searching Authority, The Internationals Search Report and the Written Opinion, dated Dec. 1, 2017, PCT/CN2017/076777, 11 Pgs.

* cited by examiner

UPGRADING ACCESS POINTS

BACKGROUND

In some computing networks, access points (APs) may provide network connectivity to client devices. Occasionally, APs may have to be upgraded. For example, an image may have to be distributed to APs to upgrade the APs. Upgrading an AP may include downloading, by an AP, an image and upgrading an existing image of the AP using the downloaded image.

DETAILED DESCRIPTION

A network may include a cluster of APs. The cluster of APs may provide network connectivity to client devices. An AP can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In order to provide efficient and secure network connectivity, updated, and/or new functionality to various client devices, APs may have to be periodically updated. In some examples, an updated image version of an AP may have to be distributed to the APs of an AP cluster in order to provide efficient and secure network connectivity, and/or updates providing updated and/or new functionality to client devices. For instance, an updated image version of an AP may include efficiency, security, and/or functionality updates. In some examples, a new AP may join the AP cluster, and may have to upgrade its image version such that the image of the new AP is in sync with the rest of the APs in the AP cluster. As used herein, the term "image" can, for example, refer to a file including machine readable instructions that, when executed, may store machine readable instructions in memory and/or in flash memory or disk memory. The term "image version" can, for example, refer to a version of the file including the machine readable instructions of the image. As used herein, the term "upgrade" can, for example, refer to an AP downloading an image from another AP or from a server and upgrading the image of the AP using the downloaded image.

Allowing each AP in an AP cluster to upgrade from a server may utilize a large amount of bandwidth as compared to limiting an amount of APs that may upgrade from the server. In examples in which network bandwidth is charged for use, upgrading APs in an AP cluster in this manner may be costly. Upgrading APs according to the disclosure allows for upgrades of APs in an AP cluster while limiting network bandwidth usage.

Figure 1:
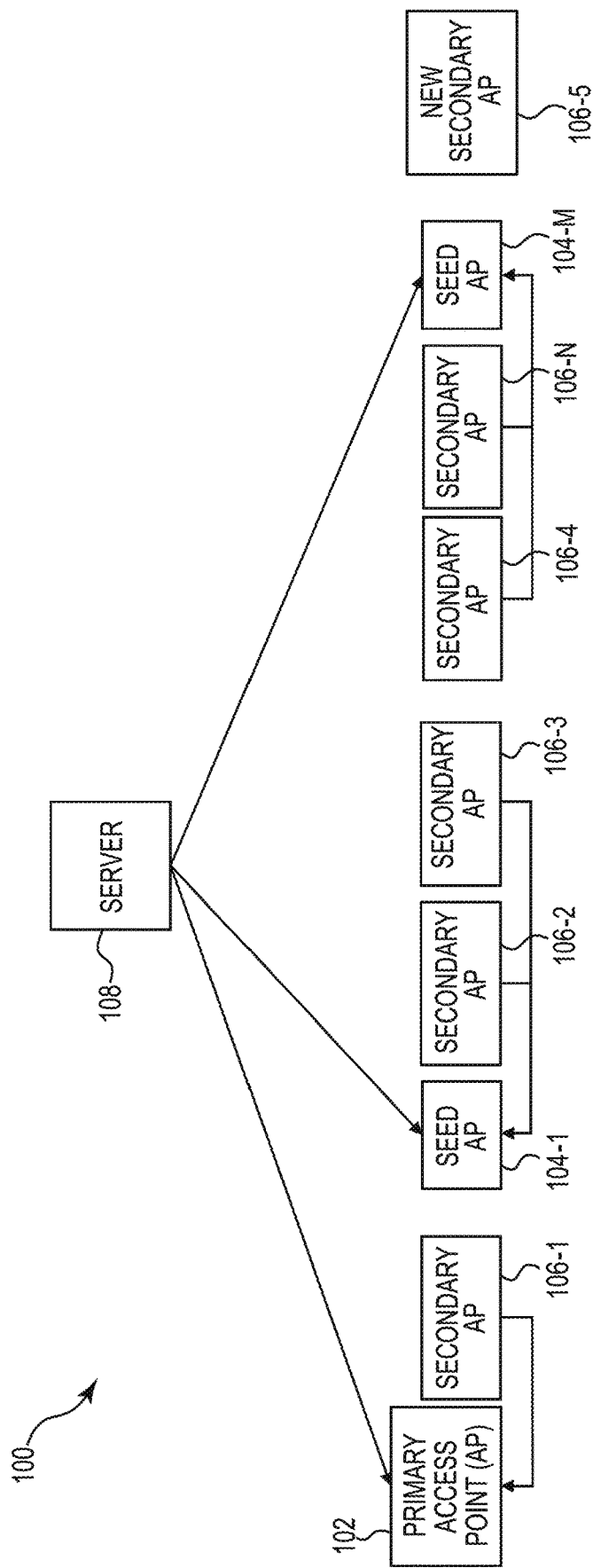
FIG. 1 illustrates an example of a network layout consistent with the disclosure.

FIG. 1 illustrates an example of a network layout 100 consistent with the disclosure. As illustrated in FIG. 1, the network layout 100 may include a primary AP 102, seed APs 104-1, 104-M (referred to collectively as seed APs 104), secondary APs 106-1, 106-2, 106-3, 106-N (referred to collectively as secondary APs 106), and server 108.

As used herein, the term "client device" can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Network layout 100 can include an AP cluster. The AP cluster can include the primary AP 102, seed APs 104, and secondary APs 106, although examples of the disclosure are not limited to a primary AP, seed APs, and secondary APs.

Each seed AP 104 can include a plurality of secondary APs 106 of the same class as each seed AP 104. For example, seed AP 104-1 can include secondary APs 106-2 and 106-3, where secondary APs 106-2 and 106-3 are the same class of AP as seed AP 104-1. Seed AP 104-M can include secondary APs 106-4 and 106-N, where secondary APs 106-4 and 106-N are the same class of AP as seed AP 104-M. Primary AP 102 can include secondary AP 106-1, where secondary AP 106-1 is the same class of AP as primary AP 102. Primary AP 102, seed AP 104-1, and seed AP 104-M are different classes of APs. As used herein, the term "AP class" can, for example, refer to a classification of an AP based on an image type a particular AP can install and/or execute.

Primary AP 102 can receive a data transmission from secondary APs 106. As used herein, the term "data transmission" can, for example, refer to information transmitted from a first AP to a second AP. As used herein, the term "information" can, for example, refer to data, addresses, control, management (e.g., statistics) or any combination thereof. For transmission, information may be transmitted as a message, which may, for example, be in the form of a collection of bits in a predetermined format. One type of message, namely a wireless message, includes a header and payload data having a predetermined number of bits of information. The wireless message may be placed in a format as a plurality of packets, frames, or cells. In some examples, the data transmission can be a heartbeat transmission used to determine a disrupted connection and/or terminate an idle connection.

The data transmission, received by primary AP 102, can include a class of a secondary AP 106 and an image version of the secondary AP 106. As an example, secondary AP 106-2 can send a data transmission to primary AP 102, where the data transmission includes the class of secondary AP 106-2 and the image version of secondary AP 106-2.

The data transmission can be received from the secondary AP 106 at a predetermined interval. For example, the secondary AP 106 can transmit a data transmission to primary AP 102 every two seconds, although examples of the disclosure are not limited to transmission of a data transmission every two seconds. For example, the transmission of the data transmission primary AP 102 can be faster or slower than every two seconds. The predetermined interval can be configurable.

Primary AP 102 can determine, in response to receiving the data transmission from a secondary AP 106, whether an image version of the secondary AP 106 and a class of the secondary AP 106 are a same image version and class as the primary AP 102. Primary AP 102 can determine the image version and class of secondary AP 106 in response to a cluster upgrade process, or in response to synchronizing a new secondary AP 106-5 joining the AP cluster.

In some examples, a cluster upgrade may include primary AP 102 receiving an image version upgrade (e.g., from server 108) and distributing the image version upgrade to the APs included in the AP cluster. Primary AP 102 can determine a class of each AP in the AP cluster, and based on the AP class, instruct each AP on upgrading the image version of each AP, as will be further described in connection with FIG. 2.

In some examples, a new secondary AP 106-5 joining the AP cluster can include synchronizing the image version of the new secondary AP 106 with an image version of the existing APs in the AP cluster. Primary AP 102 can determine the class of the new secondary AP 106-5 joining the AP cluster, and based on the AP class, instruct the new secondary AP 106-5 on upgrading the image version of the new secondary AP 106-5, as will be further described in connection with FIG. 3.

In an example in which a new secondary AP 106-5 joins the AP cluster, primary AP 102 can instruct new secondary AP 106-5 to upgrade the image version of new secondary AP 106-5 from primary AP 102 or seed AP 104 in response to the secondary AP 106-5 being the same class as the primary AP 102 or a seed AP 104 and the image version of new secondary AP 106-5 not being the same as the primary AP 102 or a seed AP 104. In other words, if the new secondary AP 106-5 is the same class as the primary AP 102 and the image version of new secondary AP 106-5 is not the same image version as primary AP 102, the primary AP 102 can upgrade the new secondary AP 106-5. If the new secondary AP 106-5 is the same class as a seed AP 104 and the image version of new secondary AP 106-5 is not the same image version as primary AP 102, the seed AP 104 can upgrade the new secondary AP 106-5. In an example in which the new secondary AP 106-5 is not the same class as the primary AP 102 or a seed AP 104, and the image version of new secondary AP 106-5 is not the same image version as the image version of primary AP 102, new secondary AP 106-5 can be instructed by primary AP 102 to become a new seed AP and upgrade the image version from server 108, as will be further described herein.

Primary AP 102 may determine whether the class of a secondary AP 106 is a same class as a seed AP 104 in response to the image version of the secondary AP 106 being different from the primary AP 102 and the class of the secondary AP 106 being different from the primary AP 102. Primary AP 102 may instruct the secondary AP 106 to upgrade the image version of secondary AP 106 from the seed AP 104 in response to the seed AP 104 being the same class as the secondary AP 106.

In an example of an AP cluster upgrade process, primary AP 102 can determine whether the class of secondary AP 106-2 is a same class as seed AP 104-1. In response to the secondary AP 106-2 being the same class as seed AP 104-1, primary AP 102 can instruct secondary AP 106-2 to upgrade the image of secondary AP 106-2 from seed AP 104-1.

In an example of an AP synchronization process, primary AP 102 can determine whether the class of new secondary AP 106-5 is a same class as primary AP 102, seed AP 104-1 or seed AP 104-M. In response to new secondary AP 106-5 being the same class as, for example, seed AP 104-1, primary AP 102 can instruct new secondary AP 106-5 to upgrade the image of new secondary AP 106-5 from seed AP 104-1.

Primary AP 102 may upgrade secondary AP 106 in response to the image version of the secondary AP 106 being different from the primary AP 102 and the class of the secondary AP 106 being the same as the primary AP 102. In other words, if the class of the secondary AP 106 is the same as primary AP 102, and the image version of the secondary AP 106 is different from primary AP 102, primary AP 102 can upgrade the secondary AP 106.

In an example of an AP cluster upgrade process, primary AP 102 can determine whether the class of secondary AP 106-1 is a same class as primary AP 102. In response to the class of secondary AP 106-1 being the same class as primary AP 102, primary AP 102 can upgrade the image of secondary AP 106-1.

In an example of an AP synchronization process, primary AP 102 can determine whether the class of new secondary AP 106-5 is a same class as primary AP 102. In response to new secondary AP 106-5 being the same class as primary AP 102, primary AP 102 can upgrade the image of new secondary AP 106-5.

Primary AP 102 may instruct a new secondary AP 106-5 to become a different seed AP. That is, if the image version of the new secondary AP 106-5 is different from the primary AP 102, and the class of the new secondary AP 106-5 is different from primary AP 102, and seed APs 104-1 and 104-M, primary AP 102 can instruct new secondary AP 106-5 to become a different seed AP.

In an example of an AP synchronization process, new secondary AP 106-5 can join the AP cluster. Primary AP 102 may determine that the image version of new secondary AP 106-5 is different from the image version of primary AP 102. Primary AP 102 may determine that the class of new secondary AP 106-5 is different from primary AP 102, as well as seed APs 104-1 and 104-M. In response, primary AP 102 can instruct new secondary AP 106-5 to become a new seed AP, since the class of new secondary AP 106-5 is not the same as the primary AP 102 or seed APs 104.

Primary AP 102 can instruct new secondary AP 106-5 (e.g., new seed AP) to upgrade the image version of new secondary AP 106-5 from server 108. For example, in response to new secondary AP 106-5 being a different class from primary AP 102, seed AP 104-1, and seed AP 104-M, new secondary AP 106-5 can upgrade the image version from server 108. In other words, as a result of new secondary AP 106-5 being a new class of AP in the AP cluster, new secondary AP 106-5 may upgrade the image version from server 108.

Primary AP 102 can refrain from upgrading secondary AP 106 in response to the image version of secondary AP 106 being the same as primary AP 102. For example, in an AP synchronization process, primary AP 102 can determine whether the image version of new secondary AP 106-5 is the same as primary AP 102. In response to the image versions of primary AP 102 and new secondary AP 106-5 being the same, primary AP 102 can refrain from upgrading new secondary AP 106-5.

As described above, primary AP 102 can determine image versions and classes of APs included in the AP cluster. Based on the image version and class determination, primary AP 102 can instruct each AP on upgrading the image version of each AP. That is, primary AP 102 can instruct secondary APs 106 to upgrade an image version from a seed AP 104 of the same class as the respective secondary APs 106 or from the primary AP 102. The seed APs 104 and the primary AP 102 can upgrade their image versions from the server 108, and the secondary APs 106 can upgrade their image versions from the seed APs 104 or the primary AP 102. Upgrading access points, as described above, can allow for select APs of an AP cluster to upgrade from a server, reducing an amount of bandwidth for upgrading APs as compared to all APs in the AP cluster upgrading the image version from the server.

Figure 2:
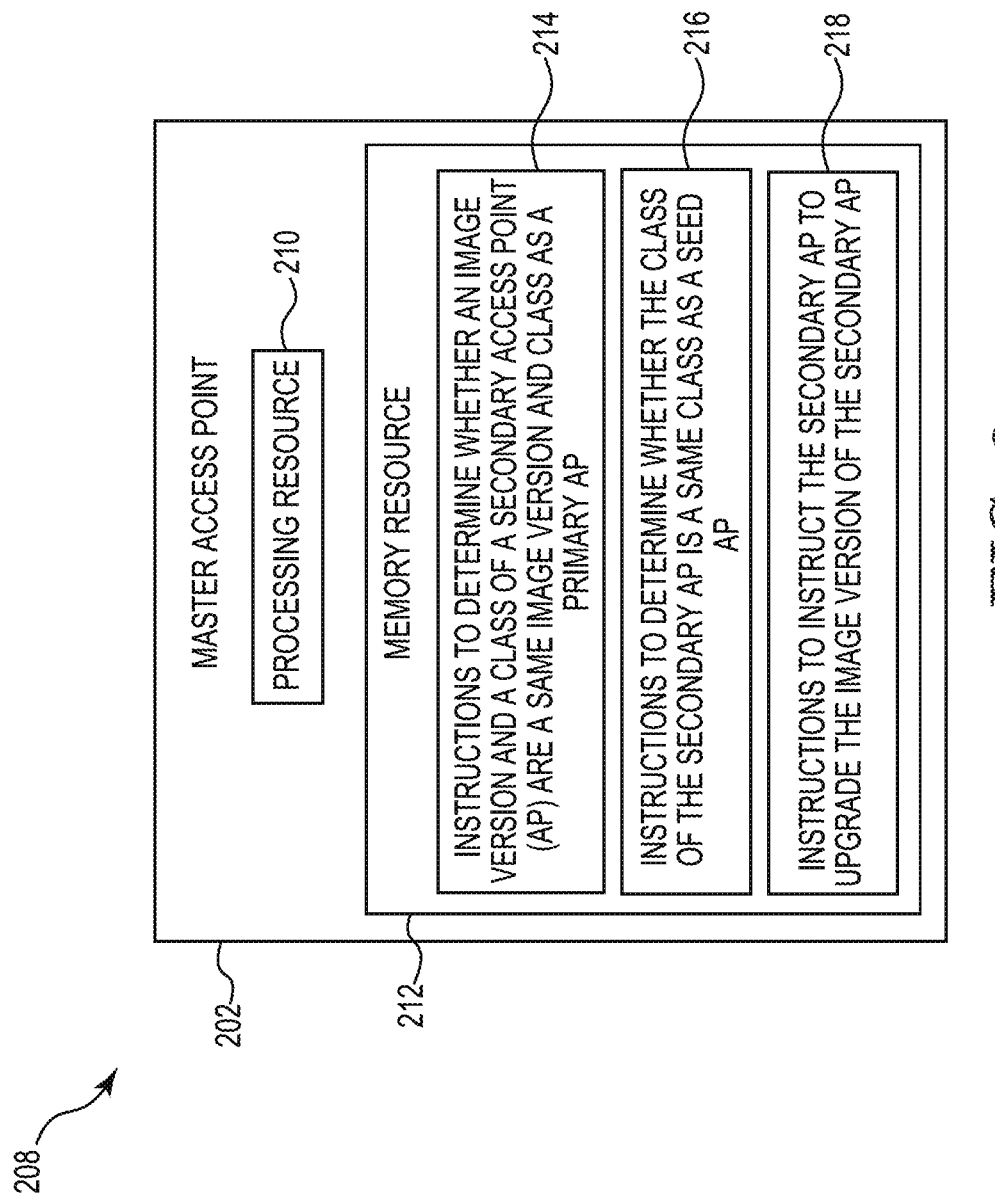
FIG. 2 is a block diagram of an example of a primary access point (AP) upgrading access points consistent with the disclosure.

FIG. 2 is a block diagram 208 of an example primary AP 202 for upgrading access points, consistent with the disclosure. As described herein, the primary AP 202 (e.g., primary AP 102, previously described in connection with FIG. 1) may perform a function related to upgrading APs.

As illustrated in FIG. 2, the primary AP 202 may comprise a processing resource 210, and a memory resource 212 storing machine readable instructions to cause the processing resource 210 to perform an operation relating to upgrading APs. That is, using the processing resource 210 and the memory resource 212, the primary AP 202 may instruct APs to upgrade an image version of APs in an AP cluster in response to an AP cluster upgrade, among other operations. Processing resource 210 may be a central processing unit (CPU), microprocessor, and/or other hardware device suitable for retrieval and execution of instructions stored in memory resource 212.

Although the following descriptions refer to an individual processing resource and an individual memory resource 212, the descriptions may also apply to a system with multiple processing resources and multiple memory resources. In such examples, the primary AP 202 may be distributed across multiple memory resources and the primary AP 202 may be distributed across multiple processing resources. Put another way, the instructions executed by the primary AP 202 may be stored across multiple memory resources and executed across multiple processing resources, such as in a distributed or virtual computing environment.

The primary AP 202 may receive an image version upgrade from a server as an AP cluster upgrade. In some examples, primary AP 202 can instruct existing seed APs to upgrade their respective image versions from the server. After primary AP 202 has upgraded from the server, primary AP 202 can begin instructing and upgrading other APs in the AP cluster. For example, the primary AP 202 may include instructions 214 stored in the memory resource 212 and executable by the processing resource 210 to determine whether an image version and a class of a secondary AP are a same image version and class as primary AP 202.

In some examples, the secondary AP can be a different image version from the primary AP 202 but the same class as primary AP 202. In response to the primary AP 202 being the same class as the secondary AP, the primary AP 202 can upgrade the secondary AP.

The primary AP 202 may include instructions 216 stored in the memory resource 212 and executable by the processing resource 210 to determine whether the class of the secondary AP is a same class as a seed AP. For example, in response to the primary AP 202 having a different image version and being of a different class than the secondary AP, primary AP 202 can determine whether the secondary AP is the same class as a seed AP in the AP cluster.

The primary AP 202 may include instructions 218 stored in the memory resource 212 and executable by the processing resource 210 to instruct the secondary AP to upgrade the image version of the secondary AP. For example, in response to the seed AP being the same class as the secondary AP and having a different image version than the primary AP 202, primary AP 202 can instruct the secondary AP to upgrade the image version of the secondary AP from the seed AP.

In some examples, the primary AP 202 can instruct the secondary AP to become a seed AP. For instance, in response to the image version of the secondary AP being different from the primary AP 202, and the class of the secondary AP being different from the seed AP, primary AP 202 can instruct the secondary AP to become a new seed AP. The primary AP 202 can instruct the new seed AP to upgrade the image version of the new seed AP from the server.

In some examples, the primary AP 202 can refrain from upgrading the secondary AP in response to the image version of the secondary AP being the same as the primary AP 202. For instance, the primary AP 202 can refrain from upgrading the image version of the secondary AP in the event the image version of the secondary AP is the same as the primary AP 202, since the image version of the secondary AP may be current.

The primary AP 202 may be predetermined. For example, primary AP 202 may be designated as primary AP 202 during installation of the AP cluster.

Primary AP 202 may repeat this process for some and/or all APs included in an AP cluster during an AP cluster upgrade. That is, the primary AP 202 may upgrade APs included in the AP cluster that are a same class as the primary AP 202, and/or instruct other secondary APs to upgrade from seed APs that are a same class as the secondary APs. In this manner, the primary AP 202 and seed APs upgrade image versions from a server, and other secondary APs upgrade image versions from the primary and/or seed APs. Limiting the APs in an AP cluster that upgrade image versions from a server can reduce network bandwidth as compared to all APs in the AP cluster upgrading image versions from the server.

Figure 3:
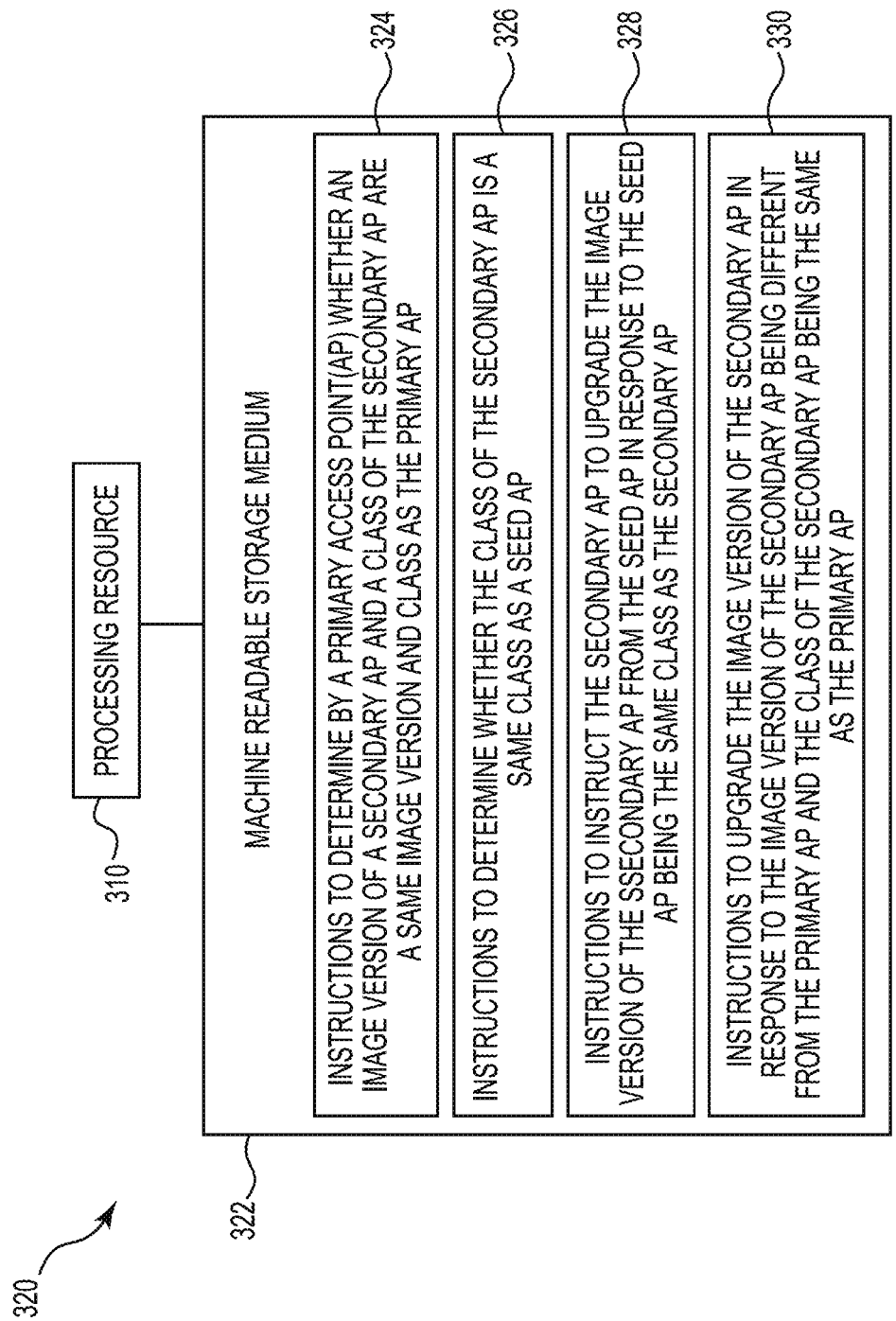
FIG. 3 is a block diagram of an example of a system consistent with the disclosure.

FIG. 3 is a block diagram of an example system 320, consistent with the disclosure. In the example of FIG. 3, system 320 includes a processing resource 310 (e.g., processing resource 210, previously described in connection with FIG. 2) and a machine readable storage medium 322. Although the following descriptions refer to an individual processing resource and an individual machine readable storage medium, the descriptions may also apply to a system with multiple processing resources and multiple machine readable storage mediums. In such examples, the instructions may be distributed across multiple machine readable storage mediums and the instructions may be distributed across multiple processing resources. Put another way, the instructions may be stored across multiple machine readable storage mediums and executed across multiple processing resources, such as in a distributed computing environment.

Processing resource 310 may be a central processing unit (CPU), microprocessor, and/or other hardware device suitable for retrieval and execution of instructions stored in machine readable storage medium 322. In the particular example shown in FIG. 3, processing resource 310 may receive, determine, and send instructions 324, 326, 328, and 330. As an alternative or in addition to retrieving and executing instructions, processing resource 310 may include an electronic circuit comprising an electronic component for performing the operations of the instructions in machine readable storage medium 322. With respect to the executable instruction representations or boxes described and shown herein, it should be understood that part or all of the executable instructions and/or electronic circuits included within one box may be included in a different box shown in the figures or in a different box not shown.

Machine readable storage medium 322 may be any electronic, magnetic, optical, or other physical storage device that stores executable instructions. Thus, machine readable storage medium 322 may be, for example, Random Access Memory (RAM), an Electrically-Erasable Programmable Read-Only Memory (EEPROM), a storage drive, an optical disc, and the like. The executable instructions may be "installed" on the system 320 illustrated in FIG. 3. Machine readable storage medium 322 may be a portable, external or remote storage medium, for example, that allows the system 320 to download the instructions from the portable/external/remote storage medium. In this situation, the executable instructions may be part of an "installation package". As described herein, machine readable storage medium 322 may be encoded with executable instructions related to upgrading APs. That is, using processing resource 310, machine readable storage medium 322 may instruct an AP to upgrade an image version of the AP in response to the AP joining an AP cluster, among other operations.

Instructions 324 to determine by a primary AP whether an image version of a secondary AP and a class of the secondary AP are a same image version and class as the primary AP, when executed by processing resource 310, may cause system 320 to determine whether an image version of the secondary AP and a class of the secondary AP are the same image version and class as the primary AP. Instructions 324 may be executed in response to the secondary AP joining an AP cluster. For example, the secondary AP may join an existing AP cluster, and the primary AP may determine whether an image version of the secondary AP and a class of the secondary AP are the same image version and class as the primary AP.

Instructions 326 to determine whether the class of the secondary AP is a same class as a seed AP, when executed by processing resource 310, may cause system 320 to determine whether the class of the secondary AP is a same class as a seed AP in response to the image of the secondary AP being different from the primary AP and the class of the secondary AP being different from the primary AP.

Instructions 328 to instruct the secondary AP to upgrade the image version of the secondary AP from the seed AP in response to the seed AP being the same class as the secondary AP, when executed by processing resource 310, may cause system 320 to upgrade the image version of the secondary AP from the seed AP in response to the seed AP being the same class as the secondary AP. For example, in response to the secondary AP being the same class as the seed AP and the image version of the secondary AP being different than the primary AP, the primary AP can instruct the secondary AP to upgrade the image version of the secondary AP from the seed AP.

Instructions 330 to upgrade the image version of the secondary AP in response to the image version of the secondary AP being different from the primary AP and the class of the secondary AP being the same as the primary AP, when executed by processing resource 310, may cause system 320 to upgrade the image version of the secondary AP in response to the image version of the secondary AP being different from the primary AP and the class of the secondary AP being the same as the primary AP. For example, in response to the secondary AP being the same class as the primary AP and the image version of the secondary AP being different than the primary AP, the primary AP can upgrade the secondary AP.

In some examples, the primary AP may instruct the secondary AP to become a seed AP. For instance, in response to the image version of the secondary AP being different from the primary AP and the class of the secondary AP being different from the seed AP, the primary AP can instruct the secondary AP to become a new seed AP. The primary AP can instruct the new seed AP to upgrade the image version of the new seed AP from a server.

In some examples, the primary AP can refrain from upgrading the secondary AP in response to the image version of the secondary AP being the same as the primary AP. For instance, the primary AP can refrain from upgrading the image version of the secondary AP in the event the image version of the secondary AP is the same as the primary AP.

In this manner, APs joining an existing AP cluster may be synchronized with the other APs in the AP cluster. That is, the image version of an AP joining an existing AP cluster may be synchronized with the image versions of the other APs in the cluster. This synchronization may be accomplished while limiting the APs in the AP cluster that upgrade image versions from a server.

Figure 4:
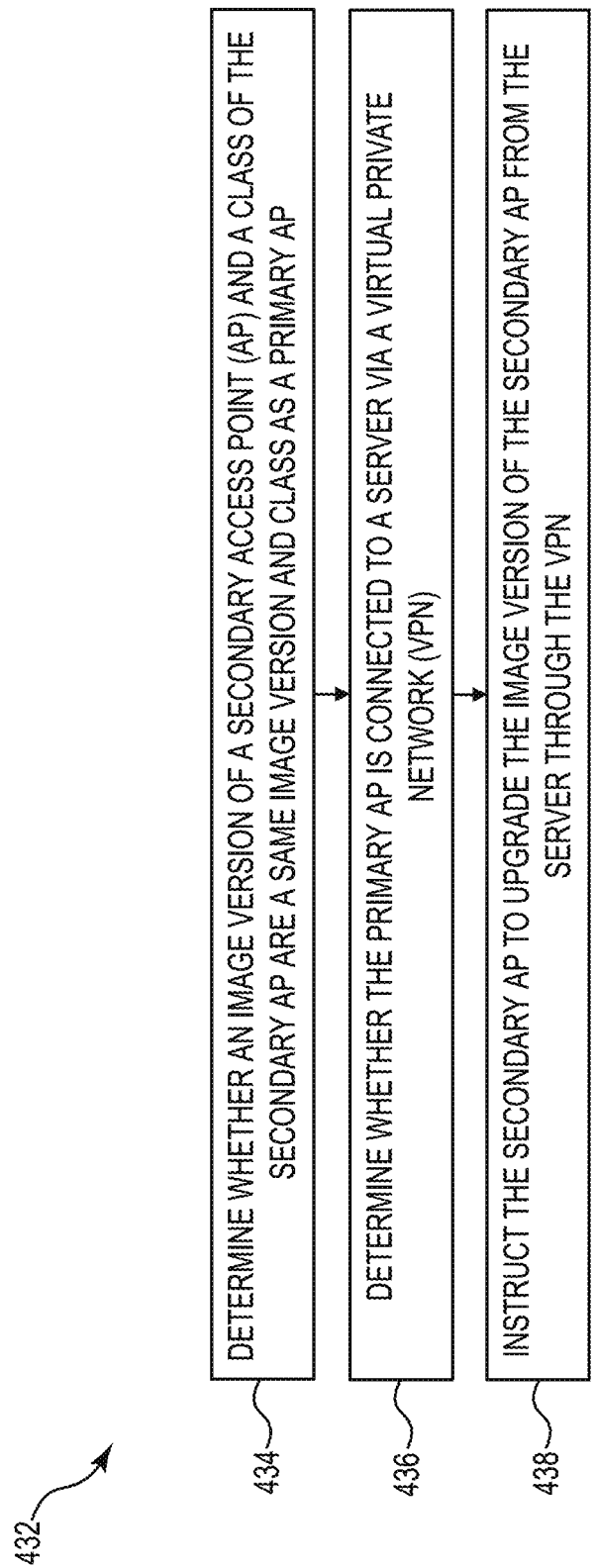
FIG. 4 illustrates an example of a method consistent with the disclosure.

FIG. 4 illustrates an example method 432 consistent with the disclosure. Method 432 may be performed by a primary AP (e.g., primary AP 102, 202, described in connection with FIGS. 1 and 2, respectively).

At 434, the method 432 may include determining whether an image version of a secondary AP and a class of the secondary AP are a same image version and class as a primary AP. For example, in response to an AP cluster upgrade, or in response to an AP joining an existing AP cluster, the primary AP can determine the image version of a secondary AP and a class of a secondary AP.

At 436, the method 432 may include determining whether the primary AP is connected to a server via a virtual private network (VPN). As used herein, the term "VPN" can, for example, refer to a network connection over a public network such as the Internet or a private network such as a wireless local area network (WLAN). As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

In some examples, the primary AP may have access to a server and other APs in the AP cluster may not have access to the server, such as when the server is behind a VPN tunnel. As used herein, the term "VPN tunnel" can, for example, refer to a link between two locations (e.g., a primary AP and a server). In this example, seed APs and secondary APs do not have access to the server, and therefore may not be able to upgrade image versions if, for example, a new AP joins the AP cluster.

At 438, the method 432 may include instructing the secondary AP to upgrade the image version of the secondary AP from the server through the VPN. That is, the primary AP may instruct the secondary AP to upgrade the image version through the VPN in response to the image version of the secondary AP being different from the primary AP, the class of the secondary AP being the same as the primary AP, and the server being behind the VPN of the primary AP.

The secondary AP may access the server through the VPN via the primary AP to upgrade the image version of the secondary AP. In other words, the primary AP can act as a proxy for the secondary AP such that the secondary AP may upgrade the image version of the secondary AP, as will be further described herein.

In order for the secondary AP to access the server through the VPN, the primary AP can request a uniform resource locator (URL) for an image version for the secondary AP from the server via the VPN. As used herein, the term "URL" can, for example, refer to a reference to a web resource (e.g., an image) that specifies the location of the web resource and a mechanism for retrieving it. For example, the primary AP can request a URL specifying the location of the image version for the secondary AP. The server can provide the primary AP with the URL in response to the URL request by the primary AP.

The primary AP can modify the URL for the image version such that the modified URL points to the primary AP. For example, the primary AP can modify the URL such that the modified URL specifies the location of the image to be the primary AP. The primary AP can send the modified URL to the secondary AP.

The primary AP can instruct the secondary AP to use the modified URL to access the server through the VPN via a network address translation (NAT) of the primary AP to upgrade the image version of the secondary AP. As used herein, the term "NAT" can, for example, refer to modifying network address information in Internet Protocol (IP) datagram packet headers while they are in transit across a traffic routing device (e.g., the primary AP).

For example, the primary AP can create a dual NAT to allow the secondary AP to access the server through the VPN via the primary AP. That is, information sent by the secondary AP to the primary AP to retrieve the upgraded image version for the secondary AP can be forwarded by the primary AP through the dual NAT of the primary AP via the VPN to the server, and the server can provide the upgraded image version to the secondary AP via the VPN through the dual NAT of the primary AP. The image version of the secondary AP can then be upgraded.

In an example in which the primary AP is connected to the server via the VPN, and the secondary AP is not a same class as the primary AP, the primary AP can receive the image version of the primary AP through the VPN. The primary AP can then send the image version to the secondary AP so that the secondary AP can upgrade the image version of the secondary AP.

Figure 5:
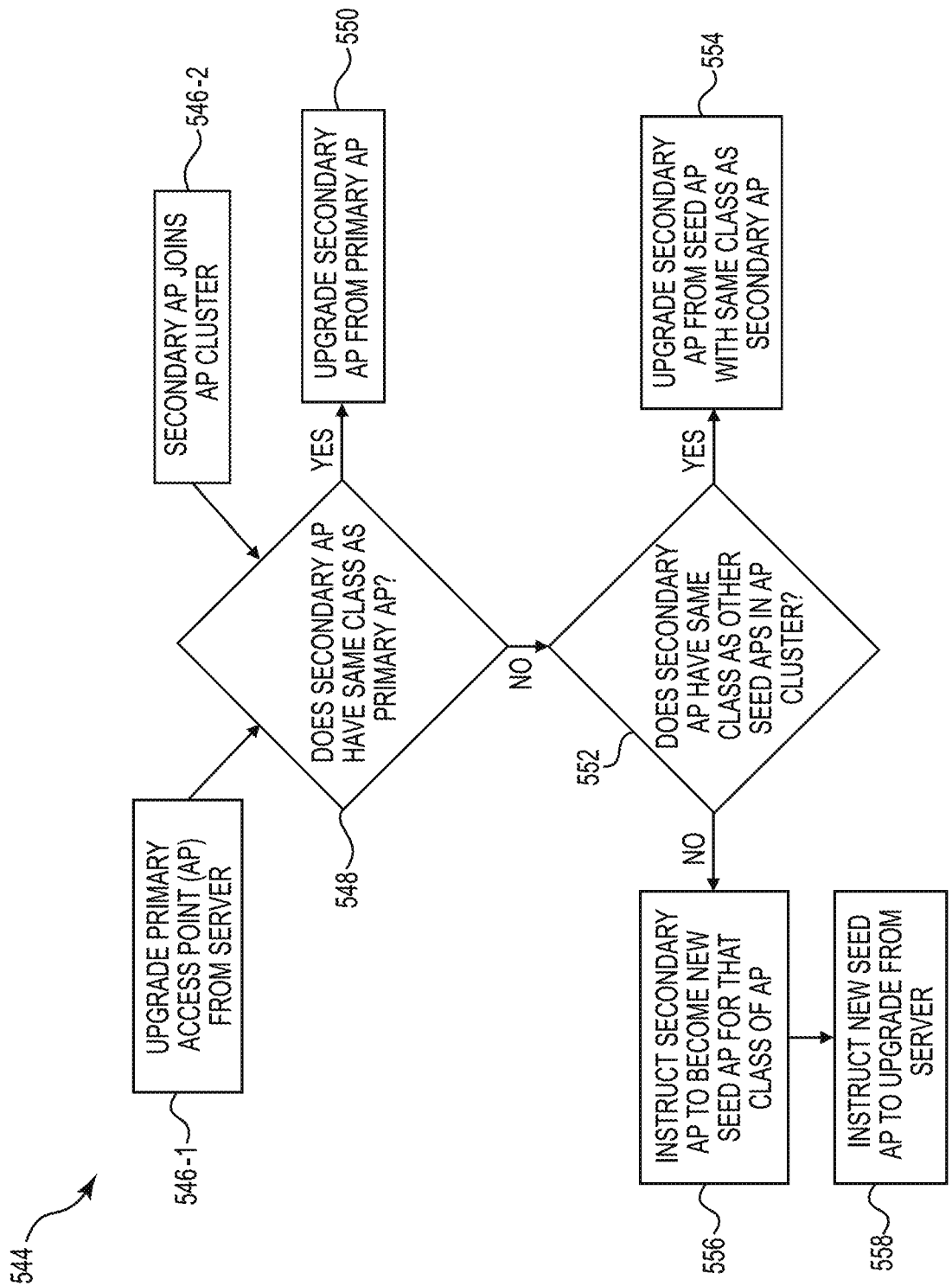
FIG. 5 illustrates an example flow chart for upgrading access points consistent with the disclosure.

FIG. 5 illustrates an example flow chart 544 for upgrading access points consistent with the disclosure.

In some examples, at 546-1, the primary AP can receive an upgraded image version from a server and upgrade the image version. For instance, an image version of a primary AP can be upgraded in preparation for an AP cluster upgrade. The image version of secondary APs and/or seed APs included in the AP cluster can be different from the image version of the primary AP.

In some examples, at 546-2, a secondary AP can join an AP cluster. For instance, a secondary AP may join an existing AP cluster. The image version of the secondary AP joining the existing AP cluster can be different from the image version of the primary AP.

At 548, the primary AP can determine whether the secondary AP has the same class as the primary AR In some examples, in response to an AP cluster upgrade, the primary AP can determine whether the secondary AP has the same class as the primary AP. In some examples, in response to a secondary AP joining an existing AP cluster, the primary AP can determine whether the secondary AP has the same class as the primary AP.

At 550, the primary AP can upgrade the secondary AP from the primary AP. For example, in response to the secondary AP having the same class as the primary AR the primary AP can upgrade the secondary AP.

At 552, the primary AP can determine whether the secondary AP has the same class as other seed APs included in the AP cluster. For example, in response to the secondary AP not having the same class as the primary AP, the primary AP can determine whether the secondary AP has the same class as other seed APs included in the AP cluster.

At 554, the secondary AP can upgrade the image version from the seed AP with the same class as the secondary AP. For example, in response to the secondary AP having the same class as the seed AP, the primary AP can instruct the secondary AP to upgrade the image version of the secondary AP from the seed AP.

At 556, the primary AP can instruct the secondary AP to become a new seed AP for that class of AR For example, in response to the secondary AP not being a same class as any other seed APs in the AP cluster, the primary AP can instruct the secondary AP to become a new seed AP for that class of AP.

At 558, the primary AP can instruct the new seed AP (e.g., the secondary AP) to upgrade the image version of the secondary AP from a server.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art, to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, the designators "M" and "N", particularly with respect to reference numerals in the drawings, indicate that a plurality of the particular feature so designated can be included with examples of the disclosure. The designators can represent the same or different numbers of the particular features. Further, as used herein, "a plurality of" an element and/or feature can refer to more than one of such elements and/or features.

What is claimed:

1. A primary access point (AP), comprising:
 a processing resource; and a memory resource storing machine readable instructions to cause the processing resource to:
  determine, in response to receiving a data transmission from a secondary AP, whether an image version of the secondary AP and a class of the secondary AP are a same image version and class as the primary AP;
  determine whether the class of the secondary AP is a same class as a seed AP in response to:
    the image version of the secondary AP being different from the primary AP; and
    the class of the secondary AP being different from the primary AP;
  instruct the secondary AP, in response to the seed AP being the same class as the secondary AP, to upgrade the image version of the secondary AP from the seed AP.

2. The primary AP of claim 1, including instructions to cause the processing resource to upgrade the secondary AP in response to:
  the image version of the secondary AP being different from the primary AP; and
  the class of the secondary AP being the same as the primary AP.

3. The primary AP of claim 1, including instructions to cause the processing resource to instruct the secondary AP to become a different seed AP in response to:
  the image version of the secondary AP being different from the primary AP; and
  the class of the secondary AP being different from the seed AP.

4. The primary AP of claim 3, including instructions to cause the processing resource to instruct the secondary AP to upgrade the image version of the secondary AP from a server.

5. The primary AP of claim 1, including instructions to cause the processing resource to refrain from upgrading the secondary AP in response to the image version of the secondary AP being the same as the primary AP.

6. The primary AP of claim 1, wherein the data transmission from the secondary AP includes a class of the secondary AP and an image version of the secondary AP.

7. The primary AP of claim 1, wherein the data transmission is received from the secondary AP at a predetermined interval.

8. A non-transitory machine readable storage medium having stored thereon machine readable instructions to cause a computer processor to:
  determine, in response to a secondary access point (AP) joining an AP cluster, whether an image version of the secondary AP and a class of the secondary AP are a same image version and class as the primary AP; and
  determine whether the class of the secondary AP is a same class as a seed AP in response to:
    the image of the secondary AP being different from the primary AP; and
    the class of the secondary AP being different from the primary AP;
  instruct the secondary AP to upgrade the image version of the secondary AP from the seed AP in response to the seed AP being the same class as the secondary AP; and
  upgrade the image version of the secondary AP in response to the image version of the secondary AP being different from the primary AP and the class of the secondary AP being the same as the primary AP.

9. The medium of claim 8, wherein the instructions cause the computer processor to instruct the secondary AP to upgrade the image version of the secondary AP from the primary AP or the seed AP in response to the secondary AP being the same class as the primary AP or the seed AP.

10. The medium of claim 8, wherein the primary AP is predetermined.

11. The medium of claim 8, wherein the AP cluster includes the primary AP, a plurality of seed APs, and a plurality of secondary APs, and wherein each seed AP includes a plurality of secondary APs of the same class as the seed AP.

12. A method, comprising:
  determining, by a primary access point (AP), whether an image version of a secondary AP and a class of the secondary AP are a same image version and class as the primary AP;
  determining, by the primary AP, whether the primary AP is connected to a server via a virtual private network (VPN); and
  instructing, by the primary AP, the secondary AP to upgrade the image version of the secondary AP from the server through the VPN in response to:
    the image version of the secondary AP being different from the primary AP;
    the class of the secondary AP being the same as the primary AP; and
    the server being behind the VPN of the primary AP.

13. The method of claim 12, wherein the method comprises accessing, by the secondary AP, the server through the VPN via the primary AP to upgrade the image version of the secondary AP.

14. The method of claim 12, wherein the method comprises:
  requesting, by the primary AP, a uniform resource locator (URL) for an image version for the secondary AP from the server via the VPN;
  modifying, by the primary AP, the URL for the image version such that the modified URL points to the primary AP; and
  sending, by the primary AP, the modified URL to the secondary AP.

15. The method of claim 14, wherein the method comprises instructing, by the primary AP, the secondary AP to use the modified URL to access the server through the VPN via a network address translation (NAT) of the primary AP to upgrade the image version of the secondary AP.

* * * * *